United States Patent
Bell

(10) Patent No.: US 12,427,460 B2
(45) Date of Patent: Sep. 30, 2025

(54) REFRACTORY FILTER

(71) Applicant: FOSECO INTERNATIONAL LIMITED, Derbyshire (GB)

(72) Inventor: David Bell, Stone (GB)

(73) Assignee: Foseco International Limited, Derbyshire (GB)

( * ) Notice: Subject to any disclaimer, the term of this patent is extended or adjusted under 35 U.S.C. 154(b) by 783 days.

(21) Appl. No.: 17/772,766

(22) PCT Filed: Oct. 29, 2020

(86) PCT No.: PCT/EP2020/080461
§ 371 (c)(1),
(2) Date: Apr. 28, 2022

(87) PCT Pub. No.: WO2021/084042
PCT Pub. Date: May 6, 2021

(65) Prior Publication Data
US 2022/0387918 A1   Dec. 8, 2022

(30) Foreign Application Priority Data
Oct. 31, 2019 (EP) .................... 19206498

(51) Int. Cl.
*B01D 39/20* (2006.01)
*B01J 20/08* (2006.01)
(Continued)

(52) U.S. Cl.
CPC ..... *B01D 39/2075* (2013.01); *B01D 39/2093* (2013.01); *B01J 20/08* (2013.01);
(Continued)

(58) Field of Classification Search
CPC ............ B01D 39/2075; B01D 39/2093; B01D 2239/10; B01D 2239/1241; B01J 20/08;
(Continued)

(56) References Cited

U.S. PATENT DOCUMENTS

| | | |
|---|---|---|
| 4,278,544 A | 7/1981 | Takashima |
| 4,331,621 A | 5/1982 | Brockmeyer |

(Continued)

FOREIGN PATENT DOCUMENTS

| | | |
|---|---|---|
| AT | E 352529 | 2/2007 |
| CL | 2012002559 | 12/2012 |

(Continued)

OTHER PUBLICATIONS

CN 108455976 machine translation. (Year: 2018).*
(Continued)

*Primary Examiner* — Tima M. McGuthry-Banks
(74) *Attorney, Agent, or Firm* — Nixon & Vanderhye PC

(57) ABSTRACT

A refractory filter suitable for filtering molten metal, such as steel, and a method and powdered composition for producing the filter. The filter comprises refractory material, the refractory material comprising: 60-90 wt % alumina; 8-30 wt % zirconia; and 3-20 wt % magnesia. The powdered composition comprises: 60-90 wt % alumina; 8-30 wt % zirconia; and 3-20 wt % magnesia, wherein the powdered composition comprises less than 12.5 wt % reactive alumina, calcined alumina or a mixture thereof, and wherein the remainder of the alumina is tabular alumina. The method comprises: providing a powdered composition in accordance with the invention; forming a filter precursor from the powdered composition and a liquid component; and firing the filter precursor to form a refractory filter.

30 Claims, 1 Drawing Sheet

(51) Int. Cl.
- *B01J 20/28* (2006.01)
- *B01J 20/30* (2006.01)
- *B01J 20/32* (2006.01)
- *B28B 1/00* (2006.01)
- *B28B 11/24* (2006.01)
- *B33Y 10/00* (2015.01)
- *B33Y 80/00* (2015.01)
- *C21C 7/00* (2006.01)

(52) U.S. Cl.
CPC ... *B01J 20/28011* (2013.01); *B01J 20/28045* (2013.01); *B01J 20/28057* (2013.01); *B01J 20/3007* (2013.01); *B01J 20/3078* (2013.01); *B01J 20/3236* (2013.01); *B01J 20/3295* (2013.01); *B28B 1/001* (2013.01); *B28B 11/243* (2013.01); *B33Y 10/00* (2014.12); *B33Y 80/00* (2014.12); *C21C 7/00* (2013.01); *B01D 2239/10* (2013.01); *B01D 2239/1241* (2013.01)

(58) Field of Classification Search
CPC ............ B01J 20/28011; B01J 20/28057; B01J 20/3007; B01J 20/3078; B01J 20/3236; B01J 20/3295; B23B 1/001; B23B 11/243; B33Y 10/00; B33Y 80/00; C21C 7/00

See application file for complete search history.

(56) References Cited

U.S. PATENT DOCUMENTS

| | | | |
|---|---|---|---|
| 4,391,918 | A | 7/1983 | Brockmeyer |
| 4,568,595 | A | 2/1986 | Morris |
| 4,839,049 | A | 6/1989 | Kinney, Jr. et al. |
| 5,045,511 | A | 9/1991 | Bosomworth et al. |
| 5,403,794 | A | 4/1995 | Morris et al. |
| 10,093,576 | B2 | 10/2018 | Goda et al. |
| 10,994,234 | B2 | 5/2021 | Zhu et al. |
| 2012/0025434 | A1 | 2/2012 | Demey et al. |
| 2014/0137603 | A1 | 5/2014 | Linnot et al. |
| 2020/0216366 | A1* | 7/2020 | San-Miguel ............ C04B 35/10 |

FOREIGN PATENT DOCUMENTS

| | | | | |
|---|---|---|---|---|
| CN | 1944330 | * | 4/2007 | |
| CN | 108455976 | * | 8/2018 | .......... C04B 35/106 |
| DE | 37 84 092 | | 7/1993 | |
| EP | 0 412 673 | | 2/1991 | |
| EP | 1 428 807 | | 6/2004 | |
| EP | 2 690 078 | | 1/2014 | |
| FR | 2 936 956 | | 4/2010 | |
| JP | S61-74611 | | 4/1986 | |
| JP | H11-256222 | | 9/1999 | |
| JP | 2013-530029 | | 7/2013 | |
| JP | 2019-527669 | | 10/2019 | |
| RU | 2 315 650 | | 1/2008 | |
| RU | 2 500 456 | | 12/2013 | |
| RU | 2515744 | | 5/2014 | |
| WO | 93/25296 | | 12/1993 | |
| WO | 2011/114080 | | 9/2011 | |
| WO | 2018/194831 | | 10/2018 | |

OTHER PUBLICATIONS

CN 1944330 machine translation (Year: 2007).*
International Search Report and Written Opinion of the International Searching Authority mailed Jan. 28, 2021, in connection with corresponding international Application No. PCT/EP2020/080461, 9 pp.
Jan. 12, 2024 Office Action issued in Chilean Patent Application No. 202201089, pp. 1-13.
Feb. 6, 2024 Search Report issued in Russian Patent Application No. 2022114460, pp. 1-3 [machine translation included].
Sep. 10, 2024 Office Action issued in Japanese Patent Application No. 2022-525522, pp. 1-4 [machine translation included].
International Preliminary Report on Patentability mailed on May 12, 2022 in corresponding International Application No. PCT/EP2020/080461; 8 pages.

* cited by examiner

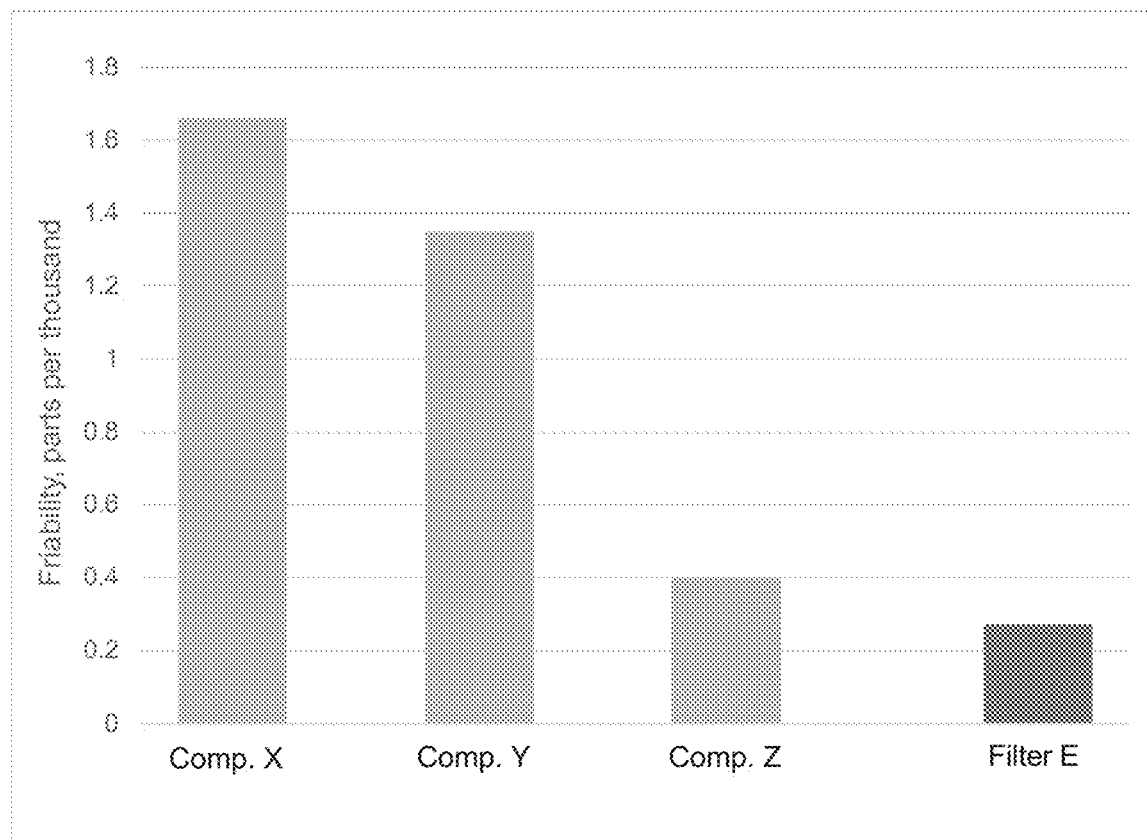

REFRACTORY FILTER

This application is the U.S. national phase of International Application No. PCT/EP2020/080461 filed Oct. 29, 2020 which designated the U.S. and claims priority to EP 19206498.8 filed Oct. 31, 2019, the entire contents of each of which are hereby incorporated by reference.

The present invention relates to a filter suitable for filtering molten metal, such as steel, and to a method of producing said filter.

Molten metals usually contain solids such as oxides of the metal and other impurities which may cause the final cast product to have undesirable characteristics. Filters have been devised to remove these impurities from the molten metal during the casting process. Normally these filters are made of refractory materials, such as ceramic materials, to withstand the high temperatures associated with molten metals.

Different types of refractory filters include cellular and pressed filters. Cellular filters are formed by extrusion techniques, e.g. by extruding a plastic ceramic body through a die, before drying, cutting and firing the resulting structure in a kiln. Cellular filters typically comprise square parallel cells extending through the depth of the filter. Pressed filters are produced by forcing shaped pins through a plastic ceramic body in a shaped die, and typically have round parallel holes extending through the filter body. Neither of these types of filter offers a tortuous path of the molten metal through the structure.

Preferred refractory filters have a foam-like appearance and are referred to in the metal filtration industry as foam filters, which are usually ceramic foam filters. The fabrication of ceramic foam filters is described in EP 0 412 673 A2 and EP 0 649 334 A1. Typically, an open celled foam (e.g. reticulated polyurethane foam) is impregnated with an aqueous slurry of refractory particles and binder. The impregnated foam is compressed to expel excess slurry and then dried and fired to burn out the organic foam and to sinter the refractory particles and binder in the slurry coating. A solid ceramic foam is thereby formed having a plurality of interconnecting voids having substantially the same structural configuration as the starting foam.

More recently, it has been possible to create intricate ceramic structures, such as filters, using 3D printing (also known as additive manufacturing). Typically, successive layers of material are formed under computer control, for example based on a virtual 3D or CAD model. In order to form a ceramic object by 3D printing, an initial structure formed by a 3D printer must be fired at a high temperature (e.g. around 1500-1700° C.) so as to sinter or fuse the ceramic material.

Zirconia-based foam filters are widely used in steel casting since they are able to withstand the high temperatures required. Zirconia-based filters usually have a very high zirconia level, e.g. up to 95% zirconia by weight. However, zirconia is very expensive, and the friability of zirconia-based foam filters can result in small pieces breaking off the filter, resulting in contamination of the casting. Zirconia filters are also dense and difficult to prime, so the molten metal has to be heated to a higher temperature before filtration.

The present invention has been devised with these issues in mind and aims to reduce the friability, density and cost of the filter by reducing the amount of zirconia in the filter.

According to a first aspect of the present invention there is provided a refractory filter for filtering molten steel, the refractory filter comprising refractory material and said refractory material comprising: 60-90 wt % alumina; 8-30 wt % zirconia; and 3-20 wt % magnesia.

In some embodiments, the refractory material comprises from 65 to 80 wt %, or from 70 to 75 wt % alumina.

In some embodiments, the refractory material comprises from 10 to 25 wt % or from 15 to 20 wt % zirconia.

In some embodiments, the refractory material comprises from 5 to 15 wt % or from 7.5 to 10 wt % magnesia.

In some embodiments, the refractory material comprises from 70 to 75 wt % alumina, from 15 to 20 wt % zirconia, and from 5 to 12.5 wt % magnesia.

In some embodiments, the refractory material comprises 75 wt % alumina, 20 wt % zirconia, and 5 wt % magnesia.

In some embodiments, the magnesia is partially or completely substituted by ceria.

In some embodiments, the refractory material further comprises titania. In some embodiments, the refractory material comprises up to 0.5 wt %, up to 1 wt %, up to 1.5 wt %, up to 2 wt %, up to 3 wt %, up to 4 wt % or up to 5 wt % titania.

In some embodiments, the refractory filter is a foam filter having a network or lattice of interconnecting strands that define interconnecting pores or voids therebetween such that multiple tortuous paths exist through the filter. In other embodiments, the refractory filter is a cellular or pressed filter.

The refractory filter is a filter capable of withstanding elevated temperatures. The refractory filter of the invention must be able to withstand the thermal shock of being heated to the high temperatures required for molten metal, and to physically withstand the mechanical shock from the impact of molten metal, in particular molten steel. Tests designed to measure these properties, including the compressive strength of the filter and the ability to withstand the impact of molten metal, are described herein.

In particular, the refractory filter of the invention must be suitable for filtering molten steel, which may have a temperature of, for example, 1500° C. or above. The filter may also be suitable for filtering other molten metals, such as titanium and alloys thereof.

The refractory filter may have a compressive strength of at least 4, at least 4.5 or at least 5 MPa. In some embodiments the compressive strength is no more than 8, no more than 7 or no more than 6 MPa. The "compressive strength" may also be referred to herein as the "crush strength" of the filter.

The refractory filter may be suitable for filtering at least 30 kg, at least 40 kg, at least 50 kg, at least 70 kg, at least 100 kg, at least 200 kg, at least 400 kg or at least 600 kg molten steel, in accordance with the method described herein.

In some embodiments the refractory material comprises less than 1 wt %, less than 0.8 wt %, less than 0.5 wt %, less than 0.3 wt %, less than 0.2 wt % or less than 0.1 wt % silica. In some embodiments the refractory material is substantially silica-free, save for unavoidable impurities that may typically be present in refractory materials. Reducing or eliminating silica is beneficial, since the presence of silica may result in the formation of low-melting species which can reduce the hot strength of the filter, which in turn may cause deformation and breakage of the filter. This is important for the filtration of metals with high melting points, such as steel and titanium.

The refractory filter has at least one first surface forming a side face of the filter and two opposed second surfaces forming the through-flow faces of the filter. The filter may have a circular, square or rectangular cross section. A filter having a circular cross section will have just one first surface whereas a filter having a square or rectangular cross section will have four first surfaces.

In some embodiments, each of the second surfaces has an area of no greater than 200 cm², no greater than 300 cm², no greater than 400 cm², or no greater than 500 cm². Preferably, each of the second surfaces has an area of at least 10 cm², at least 25 cm² or at least 50 cm².

In some embodiments, each of the second surfaces has an area of no greater than 100 cm². In such embodiments, the refractory filter may have a weight of no more than 170 g, no more than 160 g or no more than 150 g. In some embodiments, the filter has a weight of from 140 to 170 g or from 140 to 150 g.

In some embodiments, each of the second surfaces has an area of no greater than 70 cm². In such embodiments, the refractory filter may have a weight of no more than 100 g, no more than 90 g, or no more than 80 g. In some embodiments, the filter has a weight of from 70 to 100 g or from 70 to 80 g.

The density of the ceramic in the presently claimed filter is therefore lower than zirconia-based filters, and so the present invention provides a low-weight yet strong filter for the filtration of molten steel.

The refractory filter of the invention may be a refractory foam filter. The fabrication of refractory foam filters is described in EP 0 412 673 A2 and EP 0 649 334 A1. Typically, an open celled foam (e.g. reticulated polyurethane foam) is impregnated with an aqueous slurry of refractory particles and binder. The impregnated foam is compressed to expel excess slurry and then dried and fired to burn out the organic foam and to sinter the refractory particles and binder in the slurry coating. A solid ceramic foam is thereby formed having a plurality of interconnecting voids having substantially the same structural configuration as the starting foam.

Alternatively, the refractory filter may be derived from a filter precursor formed by 3D printing (also known as additive manufacturing).

In some embodiments the filter has at least one closed edge. By a "closed edge" it will be understood that the majority of the pores in at least one of the first surfaces are closed or blocked, for example by a coating. In embodiments wherein the filter comprises more than one first surface, the pores in some or all of the first surfaces may be closed. In embodiments wherein the first surface (in the case of a round filter having only one first surface) or all of the first surfaces (in the case of square or rectangular filters) are closed, the filter may be described as "framed". The closed edge or frame may help to increase the strength of the filter. U.S. Pat. Nos. 4,568,595, 4,331,621 and WO2011/114080 describe examples of the preparation of closed edge filters. The use of framed filters can improve performance by significantly increasing the mass of metal that the filter is able to withstand. In some cases, framed filters have been found to increase the capacity of the filter from 30 kg to 100 kg before failure. In some embodiments where the filter already has an inherent capacity of over 100 kg metal, framing the filter is not necessarily needed for strength but may help to further enhance the improved friability performance achieved by the composition of the present invention.

According to a second aspect of the invention there is provided a powdered composition comprising 60-90 wt % alumina; 8-30 wt % zirconia; and 3-20 wt % magnesia, wherein the powdered composition comprises less than 12.5% reactive alumina, calcined alumina or a mixture thereof.

In some embodiments, the powdered composition comprises from 65 to 80 wt % or from 70 to 75 wt % alumina.

In some embodiments, the powdered composition comprises from 10 to 25 wt % or from 15 to 20 wt % zirconia.

In some embodiments, the powdered composition comprises from 5 to 12.5 wt % or from 7.5 to 10 wt % magnesia.

In some embodiments, the powdered composition comprises from 70 to 75 wt % alumina, from 15 to 20 wt % zirconia, and from 5 to 12.5 wt % magnesia.

In some embodiments, the powdered composition comprises 75 wt % alumina, 20 wt % zirconia, and 5 wt % magnesia.

In some embodiments, the magnesia is partially or completely substituted by ceria.

The powdered composition comprises less than 12.5 wt % reactive alumina, calcined alumina or a mixture thereof, the remainder of the alumina being tabular alumina. In some embodiments, the powdered composition comprises no more than 10 wt % reactive and/or calcined alumina, or no more than 5% reactive and/or calcined alumina. In some embodiments, the powdered composition comprises only tabular alumina and no reactive or calcined alumina. The powdered composition may comprise from 0 to 10 wt %, from 1 to 9 wt % or from 2 to 8 wt % (e.g. 5 wt %) reactive alumina, calcined alumina or a mixture thereof. The powdered composition may comprise at least 60 wt %, at least 65 wt %, at least 70 wt %, or at least 75% tabular alumina.

In general terms, reactive alumina has a more "fluffy" or "feathery" texture due to the precipitation techniques used to produce it. Reactive alumina therefore absorbs more water than tabular alumina (referred to as higher water demand), which results in more shrinkage after firing. This, in turn, may reduce the strength of the resulting filter. When formed into a slurry, higher quantities of reactive alumina in the powdered composition can also make the slurry more difficult to pump and process, due to reduced flow.

In some embodiments the powdered composition comprises less than 1 wt %, less than 0.8 wt % or less than 0.5 wt % silica. In some embodiments, the powdered composition is substantially free of silica.

In some embodiments, the zirconia is reactive zirconia.

In some embodiments, the powdered composition comprises 70 wt % tabular alumina, 5 wt % reactive or calcined alumina, 20 wt % zirconia, and 5 wt % magnesia.

The tabular alumina present in the powdered composition may have a D50 particle size of less than 500 µm, less than 400 µm, less than 300 µm, less than 200 µm, less than 100 µm or less than 50 µm. In some embodiments, the tabular alumina has a D50 particle size of at least 20 µm, at least 30 µm, at least 40 µm, at least 50 µm, at least 100 µm or at least 200 µm. In some embodiments, the tabular alumina has a D50 particle size of from 20 to 500 µm, from 40 to 400 µm or from 40 to 300 µm.

In some embodiments, the tabular alumina comprises a mixture of different grades of alumina. In some embodiments, the tabular alumina comprises a mixture of finer grade tabular alumina (e.g. having a D50 particle size of less than 50 µm, or from 20 to 50 µm) and coarser grade tabular alumina (e.g. having a D50 particle size of 100 to 500 µm). In some embodiments, the finer grade tabular alumina has a D50 particle size of around 40 µm and the coarser grade tabular alumina has a D50 particle size of around 200 µm. In some embodiments, the ratio of finer grade to coarser grade tabular alumina is from 20:80 to 80:20, from 30:70 to 70:30, from 40:60 to 60:40, or 50:50.

Compositions comprising coarser grade tabular alumina (e.g. D50 particle sizes from 100 to 500 µm, or around 200

μm) may exhibit extremely low water demand and produce stronger filters having molten metal capacities significantly higher than 100 kg metal, e.g. 600 kg metal. Compositions comprising coarser grade tabular alumina may therefore be used to produce larger filters (e.g. filters wherein the first surfaces are around 150 mm in diameter or up to 500 cm$^2$ in area).

The tabular alumina may have a specific surface area (SSA) of no more than 1.0, no more than 0.8, no more than 0.5 or no more than 0.3 m$^2$/g. The specific surface area may be characterized by standard methods, for example the Brunauer-Emmett-Teller nitrogen adsorption method (ISO 9277:2010).

The reactive and/or calcined alumina, when present in the powdered composition, may have a D50 particle size of less than 20 μm, less than 10 μm, less than 5 μm or less than 3 μm, less than 2 μm or less than 1 μm.

The reactive and/or calcined alumina may have a specific surface area (SSA) of no more than 5, no more than 3, no more than 2 or no more than 1 m$^2$/g.

The magnesia present in the powdered composition may have a D50 particle size of less than 50 μm, or less than 30 μm, e.g. 20 μm.

The magnesia may have a specific surface area (SSA) of no more than 10, no more than 5, no more than 3 or no more than 2 m$^2$/g.

The zirconia present in the powdered composition may have a D50 particle size of less than 10 μm, less than 5 μm, less than 3 μm, less than 1 μm or less than 0.5 μm.

The zirconia may have a specific surface area (SSA) of no more than 10, no more than 8, no more than 6, or no more than 3 m$^2$/g.

It may be beneficial for the powdered composition to have a wide range of particle sizes. For example, the powdered composition may comprise relatively coarse particles of tabular alumina (e.g. D50 of 40 μm to 200 μm) and relatively fine particles of zirconia (e.g. D50 of 0.4 μm). The fine zirconia particles act as a bond and form complexes with the alumina. In some embodiments, a coarser grade of zirconia may be used (e.g. having a D50 particle size of 5 to 20 μm), either on its own or in combination with a finer grade zirconia (e.g. D50 of less than 1 μm). However, in such embodiments, the amount of coarser grade zirconia in the powdered composition should preferably be less than 15 wt %.

In some embodiments, the powdered composition comprises titania. In some embodiments, the powdered composition comprises up to 0.5 wt %, up to 1 wt %, up to 1.5 wt %, up to 2 wt %, up to 3 wt %, up to 4 wt % or up to 5 wt % titania. Addition of titania to the powdered composition may further increase the cold strength, metal capacity and friability performance of the filter.

Titania may also cause a slight increase in shrinkage of the filter during firing, but without an accompanying loss of strength. This effect may be particularly useful in compositions comprising coarser grades of tabular alumina (e.g. 200 μm), which exhibit very little shrinkage after firing and thus might not produce a finished filter having the exact dimensions or pore size required when made using a standard size foam precursor. Adding titania to compositions comprising coarser grades of tabular alumina may therefore allow the dimensions of the final filter to be tailored to requirements, eliminate the need to stock specially-sized foam precursors and allow standard size foam precursors to be used to produce the filter.

According to a third aspect of the present invention there is provided the use of a powdered composition according to the second aspect to form a refractory filter.

According to a fourth aspect of the present invention there is provided a method for the production of a refractory filter, comprising:
providing a powdered composition according to the second aspect of the invention;
forming a filter precursor from the powdered composition and a liquid component; and
firing the filter precursor to form a refractory filter.

In some embodiments, the step of forming the filter precursor comprises impregnating a reticulated foam substrate with a slurry comprising the powdered composition and the liquid component to form the filter precursor.

The impregnation of foam substrates by a refractory slurry is well known in the art. The reticulated foam substrate may impregnated with the slurry by spraying, roller impregnation, dipping, centrifuging, or any combination thereof. Excess slurry may be removed by pressing and/or rolling and/or centrifugation.

In some embodiments the slurry is applied by a combination of rollering (e.g. 60 wt % of the slurry may be applied by rollering) and spraying (e.g. 40 wt % of the slurry may be applied by spraying).

It will be appreciated that the viscosity of the slurry may need to be tailored according to the method of impregnation, and the skilled person will be capable of adjusting the viscosity as required. For example, for roller impregnation, the slurry may have a viscosity of from 25 to 100, from 35 to 60, from 40 to 55 or from 45 to 49 Pa·S. To apply the slurry by spraying or dipping, the slurry may have a viscosity of from 1 to 5, from 1.5 to 4 or from 2 to 3.1 Pa·S. For centrifuging, the slurry may have a viscosity of from 2 to 50 Pa·S.

The slurry may be formed by mixing the powdered composition with at least one liquid component. Thus, the method may further comprise combining the powdered composition and at least one liquid component to form a slurry.

The liquid component in the slurry may comprise any suitable liquid diluent, for example water, methanol, ethanol or light petroleum. However, water is usually employed since it provides slurries having good coating properties and is environmentally safe.

One or more additives may also be added to the slurry to modify its rheological properties. The use of such additives in the preparation of filters is well known in the art, and they include: suspension aids, such as clays; anti-foaming agents, such as silicone based liquids; binders, such as poly(vinyl acetate) (PVA); dispersants, such as lignosulphonates and/or carboxylic acids; viscosity modifiers, such as xanthan gum; and humectants, such as propylene glycol.

The reticulated foam substrate may be a polymeric foam, such as a polyether, a polyurethane (including polyether-polyurethane and polyester-polyurethane), or a cellulose foam. The reticulated foam substrate serves as a template for the resulting filter so its porosity provides an indication of the porosity of the resulting filter. Porosity may be defined in terms of the number of pores and the volume percentage of voids (pores) in the substrate. The porosity of a foam filter is usually specified in terms of number of pores per linear inch (ppi) and for metallurgical applications the porosity usually ranges from 5 ppi to 60 ppi, typically 10 ppi to 30 ppi for most foundry applications. In the foundry industry, reference to the ppi of a filter is strictly speaking a reference to the ppi of the foam substrate from which it was made.

The reticulated foam substrate used in embodiments of the invention may have a porosity of from 5 ppi to 40 ppi, from 8 to 30 ppi or from 10 to 20 ppi, e.g. 15 ppi.

Like the refractory filter it is used to form, the reticulated foam substrate has at least one first surface, which eventually forms a side face of the filter, and two opposed second surfaces, which form the through-flow faces of the filter.

In some embodiments, the method further comprises forming a closed edge on the reticulated foam substrate. The closed edge may be formed by applying an organic coating to at least one first surface of the reticulated foam substrate, prior to impregnating the foam substrate with the slurry. Upon firing, the organic material is burnt out, leaving behind a closed edge. The organic coating may be applied by, for example, spraying organic (e.g. polyurethane) fibres onto the at least one first surface of the reticulated foam substrate. Alternatively, the coating may be applied by impregnation, by wrapping the at least one first surface in a strip of organic coating material, or by melting the edge of the reticulated foam substrate. This results in the formation of a unitary closed edge which is indistinguishable from body of the filter.

In some embodiments, the step of forming the filter precursor comprises 3D printing.

3D printing is a well-known technology encompassing a variety of different techniques and processes for manufacturing 3D objects, using different materials. The term "3D printing" is often used synonymously with "additive manufacturing". Typically, in a 3D printing process, successive layers of a material are formed under computer control, for example based on a virtual or CAD design, which may enable the creation of an objection of almost any shape or geometry. The use of 3D printing to form intricate structures, such as refractory filters, is desirable since the technique enables precise control over the pore size and shape, and flow paths of the filter. 3D printing can also be used to form consistent regular shapes.

The filter precursor may be formed using any suitable 3D printing/additive manufacturing technique. Examples of suitable methods include extrusion deposition, powder bed fusion, fusion deposition modelling and ceramic inkjet printing.

In some embodiments, for example in fusion deposition modelling and ceramic inkjet printing, the 3D printing is performed by pre-mixing the powdered composition and the liquid component prior to deposition. In such embodiments, the method may comprise mixing the powdered composition and the liquid component to provide a paste or slurry, and then shaping the paste or slurry using a 3D printer to form the filter precursor.

In some alternative embodiments, e.g. in powder bed fusion, the 3D printing is performed by depositing the powdered composition, and then applying the liquid component using a 3D printer to selected regions of the deposited powdered composition. The liquid component (which may be a liquid solvent or binder) may selectively bond a layer of the powdered composition, in the regions to which the liquid component is applied. Loose powder may be removed by blowing or vacuuming. The process may then be repeated to build up a 3D filter precursor.

In some embodiments the method further comprises de-binding the filter precursor. De-binding may be carried out in embodiments wherein the filter precursor has been formed using an organic binder, as may be required by some 3D printing processes.

De-binding may be carried out by heating the filter precursor at a temperature of up to 400° C. A steady ramp in temperature may be applied over a period of time of from 2 to 10 or 3 to 8 hours, e.g. 5 hours. The de-binding process may be incorporated into the firing step, or it may be a discrete step of the method of forming the refractory filter. A discrete de-binding step may be useful for large filters.

In some embodiments, the method further comprises drying the filter precursor prior to firing. A drying step is beneficial where the filter precursor is formed from an aqueous mixture. Drying may be carried out (e.g. in an oven) at a temperature of from 110° C. to 200° C. Above 180° C. any organics present, such as a reticulated foam substrate and organic binders, will be burnt out. Drying at higher temperatures is therefore carried out for a shorter period of time than at lower temperatures. For example, at 110° C. drying may be carried out for 60 minutes, whereas at 180° C. it may take only 5 minutes.

The filter precursor may be fired at a temperature of from 1500 and 1700° C. In some embodiments, the filter precursor is fired at a temperature of greater than 1500° C., at a temperature of greater than 1550° C., or at a temperature from 1550 to 1650° C., e.g. 1600° C. Firing may be carried out for at least 30 minutes, for example from 0.5 to 5 hours or from 1 to 3 hours, e.g. for about 2 hours. In some embodiments, the filter precursor is fired in an oxidizing atmosphere, for example an atmosphere comprising greater than 0.5% oxygen.

Embodiments of the invention will now be described by way of example and with reference to the accompanying FIGURES in which:

FIG. 1 is a graph showing the friability of refractory filters, as measured by the level of broken particles of filter material following vibration.

EXAMPLE 1

Preparation of a Refractory Filter

A reticulated polyurethane foam piece was impregnated with a slurry using a combination of rollers and spraying until a desired weight was achieved. The slurry comprised approximately 90% powdered composition and 10% rheology modifiers (anti-foamer, dispersants, humectant, binder and viscosity modifiers). Water was added so as to give the required slurry viscosity.

The impregnated foam piece was then dried in an oven set at 150° C. before being fired. The firing was conducted in a tunnel (continuous) kiln set at a temperature of 1620° C.

Cold Crush Strength

The cold crush strength test is used to assess the compression strength of a filter at room temperature. Cold crush strength was determined using a test method as specified by the German Foundry Association (BDG (Bundesverband der Deutschen Giesserei-lndustrie) Directive P100, September 2012 Edition), in accordance with DIN EN 993-5: Methods of test for dense shaped refractory products—Part 5: Determination of cold crushing strength. Briefly, a refractory filter (100×100×25 mm, 10 ppi, unframed), prepared as described above, was positioned on a support of 25 mm diameter. Using a ram of the same diameter, the filter was put under load at a speed of 20 mm/min until breakage occurred. The resultant maximum force was used to determine the cold crush strength.

Metal Pouring Test

Molten stainless steel at a temperature of 1610-1620° C. was poured through a refractory filter (100×100×25 mm, 10 ppi, unframed), prepared as described above. The filter was held in a two-sided support and positioned 700 mm beneath a bottom-pour ladle with a 30 mm nozzle. The filter was deemed to pass this test if it stayed intact and did not rupture when a minimum of 30 kg molten stainless steel was poured through the filter.

Results

Filters (unframed) having the dimensions 100×100×25 mm were prepared from 8 ppi reticulated polyurethane foam pieces using the method described above. Filters were made using different powder compositions according to the recipes in Table 1 below.

The compression strength of the filters and their ability to withstand a molten steel pouring test was tested as described above. The results are shown in Table 1.

Filters made using Compositions A-C, which comprised no magnesia, did not pass the molten steel test and ruptured upon impact. Compositions D-J, which comprised between 3-20 wt % magnesia and 67.5-77 wt % alumina, passed the molten steel test. Compositions K-P, which comprised 8-30 wt % zirconia (D50 0.4 μm), also passed the molten steel test.

Composition E, which comprised 5 wt % magnesia, 20 wt % zirconia (D50 0.4 μm), 70 wt % tabular alumina and 5 wt % reactive alumina, was found to give a strong filter that was able to withstand up to 150 kg molten steel. Composition Q, which comprised reactive alumina having a smaller D50 particle size (0.4 μm vs 2.5 μm for composition E), also showed good strength in the metal pouring test.

Compositions R-W showed that filters comprising higher levels of reactive alumina (e.g. 12.5 wt % or above) and/or higher levels of zirconia with a D50 particle size of 15 μm (e.g. 15 wt % or above) were weaker and did not pass the

TABLE 1

| Comp. | Alumina (wt %) Tabular (D50: 40 μm) | Alumina (wt %) Reactive (D50: 2.5 μm) | Zirconia (wt %) D50: 0.4 μm | Zirconia (wt %) D50: 15 μm | Magnesia (wt %) | Other (wt %) | Molten steel test | Compression strength (MPa) |
|---|---|---|---|---|---|---|---|---|
| A | 70 | 0 | 30 | 0 | 0 | 0 | Fail | 4.5 |
| B | 70 | 29 | 0 | 0 | 0 | 1[b] | Fail | 6.3 |
| C | 70 | 20 | 10 | 0 | 0 | 0 | Fail | 2.3 |
| D | 72 | 5 | 20 | 0 | 3 | 0 | Pass (30 kg) | 3.6 |
| E | 70 | 5 | 20 | 0 | 5 | 0 | Pass (150 kg) | 4.6 |
| F | 75 | 0 | 20 | 0 | 5 | 0 | Pass (50 kg) | 4.5 |
| G | 67.5 | 5 | 20 | 0 | 7.5 | 0 | Pass (30 kg) | 4.4 |
| H | 62.5 | 5 | 20 | 0 | 12.5 | 0 | Pass (50 kg) | 4.0 |
| O | 65 | 5 | 16 | 0 | 14 | 0 | Pass (50 kg) | 4.6 |
| J | 65 | 5 | 10 | 0 | 20 | 0 | Pass (30 kg) | 3.1 |
| K | 82 | 5 | 8 | 0 | 5 | 0 | Pass (50 kg) | 6.3 |
| L | 74 | 5 | 16 | 0 | 5 | 0 | Pass (50 kg) | 5.4 |
| M | 55 | 5 | 20 | 0 | 20 | 0 | Pass (50 kg) | 4.4 |
| N | 66 | 5 | 24 | 0 | 5 | 0 | Pass (50 kg) | 4.9 |
| O | 65 | 5 | 25 | 0 | 5 | 0 | Pass (30 kg) | 4.1 |
| P | 60 | 0 | 30 | 0 | 10 | 0 | Pass (50 kg) | 4.9 |
| Q | 70 | 5[a] | 20 | 0 | 5 | 0 | Pass (100 kg) | 4.7 |
| R | 72.5 | 0 | 20 | 0 | 7.5 | 0 | Pass (50 kg) | 5.4 |
| S | 62 | 5 | 20 | 8 | 5 | 0 | Pass (30 kg) | 4.5 |
| T | 60 | 9 | 10 | 15 | 6 | 0 | Fail | 3.6 |
| U | 65 | 10 | 10 | 10 | 5 | 0 | Pass (30 kg) | 4.8 |
| V | 62.5 | 12.5 | 0 | 20 | 5 | 0 | Fail | 2.1 |
| W | 67 | 15 | 15 | 0 | 3 | 0 | Fail | 2.3 |
| X | 70 | 5 | 20 | 0 | 1.7 | 3.3[c] | Pass (50 kg) | 2.6 |
| Y | 70 | 5 | 20 | 0 | 1.7 | 3.3[d] | Fail | 5.9 |

[a]D50: 0.4 μm;
[b]Silica;
[c]Ceria;
[d]Yttria molten steel test, although filters comprising a mixture of zirconia having smaller and larger particle sizes (e.g. compositions S and U) did pass the molten steel test.

Composition X, in which the magnesia was partially substituted by ceria, passed the molten steel pouring test, whereas Composition Y, in which the magnesia was partially substituted by yttria, failed.

EXAMPLE 2

Powdered composition E was selected for further testing.
Friability Test

The friability of a filter prepared from powdered composition E (referred to as "Filter E") was compared to three commercially available framed and un-framed zirconia-based filters of the same dimensions (75×75×25 mm, prepared from a 10 ppi reticulated polyurethane foam), having zirconia levels of >90%. 117 of each type of filter were packed into a box, standing on edge in three layers. The box was vibrated on a table for 20 minutes. Following vibration, the crumbs resulting from breakage of the filters were weighed.

It was observed that Filter E had significantly lower friability than the commercially available filters (comparative examples X, Y, Z) (FIG. 1).

Comparison of the structure of Filter E with a standard zirconia filter by SEM analysis indicated that sintering of the refractory material is more complete in Filter E. This is thought to be the reason why the filter of the invention has lower friability than standard zirconia filters.
Deformation Test A refractory filter of circular cross-section (150 mm diameter, 30 mm depth) was prepared from a 10 ppi reticulated polyurethane foam impregnated with a slurry formed from powdered composition E (Filter E'). The deformation of Filter E' was compared with that of a commercially available filter having the same dimensions but a zirconia level greater than 90%. The filters were supported across a 110 mm span. A 170 g weight was placed on top of each filter, in the middle of the upper surface. The filters was exposed to a temperature of 1620° C. for 2.5 hours.

Following the test procedure, the deformation (i.e. sagging) of Filter E' was measured as being 3 mm, whereas for the commercially available filter the deformation was 5 mm.

EXAMPLE 3

A further composition (Composition Z) based on composition E was formulated, with half of the 40 μm grade tabular alumina being replaced with a coarser grade of tabular alumina having a D50 particle size of 200 μm. The water demand of composition Z was found to be 15% less than composition E and composition Z showed even less shrinkage after firing (around 4.5% shrinkage compared with 6% shrinkage for composition E).

Filters made with composition Z (dimensions: 75×75×25 mm) were tested using the cold crush strength and metal pouring tests described in Example 1. The filters were found to have a higher crush strength than filters made using composition E, and were easily able to withstand 100 kg molten steel poured at 1640° C. without any sign of rupturing.

EXAMPLE 4

Composition Z was tested with addition of small quantities of titanium dioxide. Addition of 0.5 wt % titania to composition Z was found to increase shrinkage by an extra 1.5%, bringing the total shrinkage to 6% (in line with conventional zirconia filters). Addition of 2 wt % titania was found to increase shrinkage by an extra 4%.

The metal capacity of filters with composition Z and comprising 0.5 wt % titania was drastically improved compared with filters made using composition E. Circular filters having a diameter of 150 mm were able to withstand 600 kg molten steel without rupturing. The cold crush strength and friability performance of the filter was also found to be improved.

A filter made using a composition comprising 10 wt % zirconia, 5 wt % magnesia and 1 wt % titania, with the remainder being made up of a 50:50 mixture of 40 μm and 200 μm tabular alumina, also performed well and the slurry was found to be easier to pump.

The invention claimed is:

1. A powdered composition for making a refractory filter comprising 60-90 wt % alumina; 8-30 wt % zirconia; and 3-20 wt % magnesia, wherein the powdered composition comprises less than 12.5 wt % reactive alumina, calcined alumina or a mixture thereof, the remainder of the alumina being tabular alumina, and wherein the zirconia has a D50 particle size of less than 3 μm.

2. The powdered composition of claim 1, wherein the powdered composition comprises from 0 to 10 wt % reactive alumina, calcined alumina or a mixture thereof.

3. The powdered composition of claim 1, wherein the powdered composition comprises at least 60 wt % tabular alumina.

4. The powdered composition of claim 1, wherein the tabular alumina has a D50 particle size of less than 500 μm.

5. The powdered composition of claim 1, wherein the tabular alumina comprises a mixture of finer grade tabular alumina having a D50 particle size of 20 to 50 μm and coarser grade tabular alumina having a D50 particle size of 100 to 500 μm.

6. The powdered composition of claim 5, wherein the ratio of finer grade tabular alumina to coarser grade tabular alumina is from 40:60 to 60:40.

7. The powdered composition of claim 1, wherein the reactive alumina, when present, has a D50 particle size of less than 10 μm.

8. The powdered composition of claim 1, wherein the magnesia has a D50 particle size of less than 30 μm.

9. The powdered composition of claim 1, wherein the zirconia has a D50 particle size of less than 1 μm.

10. The powdered composition of claim 1, wherein the powdered composition comprises less than 1 wt % silica.

11. The powdered composition of claim 10, wherein the powdered composition is substantially free of silica.

12. The powdered component of claim 1, wherein the magnesia is at least partially replaced by ceria.

13. The powder composition of claim 1, further comprising up to 5 wt % titania.

14. A refractory filter for filtering molten steel, comprising refractory material, said refractory material formed from the powdered composition of claim 1.

15. The refractory filter of claim 14, wherein the refractory material is substantially silica-free.

16. The refractory filter of claim 14, wherein the refractory filter has a compressive strength of at least 4 MPa.

17. The refractory filter of claim 14, wherein the refractory filter has at least one first surface forming a side face of the filter and two opposed second surfaces forming the through-flow faces of the filter, the second surfaces having an area of no greater than 500 cm².

18. The refractory filter of claim 14, wherein the filter is framed.

19. The refractory filter of claim 14, wherein the refractory filter is either a foam filter, a cellular filter, or a pressed filter.

20. The refractory filter of claim 14, wherein the refractory material further comprises up to 5 wt % titania.

21. The refractory filter of claim 14, wherein the refractory material is made using less than 12.5 wt % reactive or calcined alumina.

22. Use of a powdered composition according to claim 1 to form a refractory filter.

23. A method for the production of a refractory filter, comprising:
   providing a powdered composition according to claim 1;
   forming a filter precursor from the powdered composition and a liquid component; and
   firing the filter precursor to form a refractory filter.

24. The method of claim 23, wherein the filter precursor is dried prior to firing.

25. The method of claim 23, wherein forming the filter precursor comprises 3D printing.

26. The method of claim 23, wherein forming the filter precursor comprises:
   combining the powdered composition and the liquid component to form a slurry, and
   impregnating a reticulated foam substrate with the slurry to form the filter precursor.

27. The method of claim 26, wherein the reticulated foam substrate is impregnated with the slurry by spraying, roller impregnation, dipping, centrifuging, or any combination thereof.

28. The method of claim 23, wherein the filter precursor is fired at a temperature of greater than 1500° C.

29. The method of claim 23, wherein the filter precursor is fired for at least 30 minutes.

30. The method of claim 23, wherein the filter precursor is fired in an oxidizing atmosphere.

\* \* \* \* \*